(12) United States Patent
Laur et al.

(10) Patent No.: US 9,315,403 B1
(45) Date of Patent: Apr. 19, 2016

(54) SYSTEM FOR ALGAE-BASED TREATMENT OF WATER

(71) Applicant: Eldorado Biofuels, LLC, Santa Fe, NM (US)

(72) Inventors: Paul Laur, Sante Fe, NM (US); Frank Yates, Jr., Artesia, NM (US)

(73) Assignee: Eldorado Biofuels, LLC, Santa Fe, NM (US)

( * ) Notice: Subject to any disclaimer, the term of this patent is extended or adjusted under 35 U.S.C. 154(b) by 189 days.

(21) Appl. No.: 14/097,019

(22) Filed: Dec. 4, 2013

Related U.S. Application Data

(60) Provisional application No. 61/733,343, filed on Dec. 4, 2012, provisional application No. 61/754,876, filed on Jan. 21, 2013.

(51) Int. Cl.
*C02F 3/32* (2006.01)

(52) U.S. Cl.
CPC ........................................ *C02F 3/322* (2013.01)

(58) Field of Classification Search
CPC ........................................................ C02F 3/322
USPC .................. 210/602, 610, 631, 198.1, 205
See application file for complete search history.

(56) References Cited

U.S. PATENT DOCUMENTS

| | | | | |
|---|---|---|---|---|
| 3,598,726 A * | 8/1971 | Welch | ............. | 210/602 |
| 4,966,713 A * | 10/1990 | Keys et al. | .............. | 210/705 |
| 5,011,604 A | 4/1991 | Wilde et al. | | |
| 5,236,673 A | 8/1993 | Coakley et al. | | |
| 5,332,556 A | 7/1994 | Coakley et al. | | |
| 5,445,275 A | 8/1995 | Curley et al. | | |
| 5,593,099 A | 1/1997 | Langenecker | | |
| 5,732,891 A | 3/1998 | Langenecker | | |
| 5,820,759 A * | 10/1998 | Stewart et al. | ............. | 210/602 |
| 6,051,693 A | 4/2000 | Handley et al. | | |
| 6,123,483 A | 9/2000 | Langenecker | | |
| 6,350,383 B1 | 2/2002 | Douglas | | |
| 6,601,787 B1 | 8/2003 | Langenecker | | |
| 6,651,914 B1 | 11/2003 | Langenecker | | |
| 7,306,737 B2 | 12/2007 | Langenecker et al. | | |
| 7,736,508 B2 * | 6/2010 | Limcaco | ............. | 210/602 |
| 7,770,830 B1 | 8/2010 | Langenecker et al. | | |
| 7,932,437 B2 | 4/2011 | Lee | | |
| 7,977,085 B2 | 7/2011 | Rispoli et al. | | |
| 8,137,555 B2 * | 3/2012 | Kale | ............. | 210/601 |
| 2009/0294354 A1 * | 12/2009 | Theodore et al. | ............. | 210/602 |
| 2010/0330643 A1 | 12/2010 | Kilian et al. | | |
| 2011/0095225 A1 | 4/2011 | Eckelberry et al. | | |

* cited by examiner

*Primary Examiner* — Fred Prince
(74) *Attorney, Agent, or Firm* — Santangelo Law Offices, P.C.

(57) ABSTRACT

The inventive technology relates to methods for the algae-based treatment of challenged water. Embodiments of the inventive technology include methods for commercially scalable algal-growth in challenged water. Such methods include, for example a step-wise conditioning process to select and condition algae strains for high growth yields in the presence of challenged water generated from the production of oil and gas or other waste water sources. Such algae-based treatment, in addition to removing harmful chemical compounds from this water may also capture and sequester heavy metal contaminants as well as other compounds for later extraction and processing. The invention also may include embodiments for an algae based desalination system of challenged water, resulting in the production of brine salts and the like. The inventive technology also encompasses an algae-based system to capture and sequester carbon-dioxide from gas and other emissions generated from industrial sources.

24 Claims, 9 Drawing Sheets

SYSTEM FOR ALGAE-BASED TREATMENT OF WATER

This application claims the benefit of and priority to U.S. Provisional Application Nos. 61/733,343 filed Dec. 4, 2012, and 61/754,876 filed Jan. 21, 2013. The entire specification and figures of the above-mentioned applications are hereby incorporated, in their entirety by reference.

This application further relates to work performed under U.S. DOE Cooperative Agreement DE-EE0003046 28302-F. As such, U.S. government may have certain rights in this inventive technology, including "march-in" rights, to the extent provided for by the terms of U.S. DOE Cooperative Agreement.

TECHNICAL FIELD

Generally, this invention relates to techniques, systems, methods and apparatus for the growth of algae in challenged or otherwise compromised water as well a system for the algae-based treatment of challenged water. Such treated challenged water may, in some embodiments, be re-used for oil and gas production or may be disposed of in traditional produced water disposal wells or even transported for additional treatment prior to direct environmental release. Additional embodiments may include commercially scalable algal growth in challenged water using a step-wise conditioning process to select and condition algae strains and/or genetic variants for high growth yields in the presence of such water. Such algae-based treatment, in addition to removing harmful chemical compounds from this water may also capture and sequester heavy metal contaminants as well as other compounds for later extraction and processing. In addition, the invention also may include embodiments for and algae based desalination system of challenged water, resulting in possibly the production of brine salts and the like. The inventive technology also encompasses an algae-based system to capture and sequester carbon-dioxide from gas and other emissions generated from energy and other industrial production. Additional embodiments may include the commercial scale production of algae biomass as well as bio-fuel and other feedstock components which may be used for additional industrial purposes. All of the forgoing embodiments may be automated as well as configured to be adaptable to pre-existing oil and gas production or other facilities and/or pipelines.

It should be noted at the outset, that in this application the terms challenged or compromised water may broadly include water with a contaminate level different than that of fresh water. Such examples may include, but are not limited to produced water, contaminated water, sea-water, constituent water, waste-water, injection water, industrial waste water, well-water, natural waste water, water not conducive for algae growth, treated water, un-treated water, water prohibitive of algae growth, flowback water, frac water, hydraulic fracturing water and the like. As merely an exemplary embodiment, the current invention is generally described utilizing produced water however any such challenged water type may be substituted in singly or as a mix of multiple types of challenged water. However, such example is in no way limiting on the types of water generally encompassed by this application.

Additional embodiments of this invention relate to techniques, systems, methods and apparatus for the growth of algae to capture and store atmospheric and industrial generated carbon dioxide ($CO_2$) methane and other hydrocarbons, and perhaps methane produced from organic waste matter from livestock which may create a subterranean storage facility for algae feedstock to be held in reserve for national emergencies. Such algae may be re-used for oil and gas production at any time and while encased in, for example brine wells and may begin to spontaneously covert to hydrocarbon fuels. Additional embodiments may include commercially viable in-ground processes that preconditions stored algae for conversion to fungible fuels when extracted from storage.

It should be noted at the outset, that in this application the terms greenhouse gasses (GHG) may broadly include atmospheric gas that allows sunlight to penetrate it to heat the earth's surface, but may capture heat re-radiated into the atmosphere. Such examples may include, but are not limited to $CO_2$, methane and the like. As merely an exemplary embodiment, the current invention is generally described utilizing GHG emissions from industrial gas plants, however any such GHG single point emission source may be substituted in singly or as a mix of multiple types of gases. However, such example is in no way limiting on the types of gases generally encompassed by this application.

BACKGROUND OF THE INVENTION

Produced water is a term used to describe water that is produced along with oil and gas during extraction. For example, typical oil and/or gas reservoirs may have a natural water layer (formation water) that lies under hydrocarbon deposits. Extraction of these hydrocarbons can inevitably result in the extraction of produced water. Produced water may also be generated through injection extraction methods known within the industry. In this method, water is injected back into the hydrocarbon reservoir, usually to increase pressure and thereby stimulate production. Both the formation water and the injected water are eventually produced along with the oil. It should be noted that the produced water or compromised water from oil and gas facilities may vary by region or even lifecycle of the well. In addition, produced or compromised water from disparate regions of facilities may be mixed together prior to treatment or disposal resulting in great variation of constituents present in the water. Such variability compounds the need for a solution, such as the current invention that may operate with a wide variability of produced or compromised water constituents. However, while the extracted hydrocarbons are eventually separated from the produced water and further refined for commercial uses, the generation and treatment of produced water raises important technical, environmental, may be economical problems associated with oil and gas production.

For example, produced water may be fresh or salty (or saline) water, but can also contain varying amounts of: hydrocarbons such as oil and grease; industrial chemical additives; sulfides such as hydrogen sulfide; BTEX's (benzene, toluene, ethyl benzene, and xylene-volatile aromatic compounds); other toxic compounds; naturally occurring radioactive material; and sediments. Produced water is usually considered hazardous waste and usually requires special disposal and handling.

Produced water can even represent the largest waste stream associated with oil and gas production. In the United States, it is estimated that on average nine barrels of water are produced for each barrel of oil. The environmental impact of handling, treating and disposing of the produced water negatively affects the profitability of oil and gas production. For example, approximately 60% of water produced with conventional oil and gas is disposed of via deep well injection at a cost of $0.50 to $1.75/bbl in wells that cost in excess of $400,000 to $3,000,000 to create and use. The annual cost of disposing of the produced water in the United States is estimated to be $5-10 billion dollars per year.

Any remaining produced water usually must be treated before it can be released to the environment. Typically, produced water treatment technologies are limited to treating specific constituent types concentrated in the water, e.g., dissolved solids, organics, conductive ions, etc. Depending on the eventual use of the water and the desired constituent concentrations, treatment processes are often coupled together to achieve required water use objectives. However, typical treatment steps are expensive and may be cost/technologically prohibitive depending on a variety of factors such as access to fresh water or other regulatory concerns. For example, the quality of produced water varies from region to region, and some treatment technologies may be viable in one region but not in another region. In addition, operators often produce large volumes of produced water, particularly during the early extraction phase and the quality, as well as the volume may change during the approximately 20 years of life of a well. As such, the ability to treat effectively—and economically—produced water is an important factor in the exploration and formation of new wells. Furthermore, with the advent of new injection well, as well as "hydraulic fracturing" techniques, such concerns have only grown in recent years and will continue to do so for the foreseeable future.

The foregoing problems regarding the treatment of produced water may represent a long-felt need for an effective—and economical—solution to the same. It is well known within the industry that the presence of various chemical such as sulfides and BTEX's are toxic to algae and act as inhibitors to any growth in produced water. In this regard, the Applicant's system for an algae-based treatment of produced water in its various embodiments is contrary to some expectations and effectively solves many of the aforementioned problems in a new and non-obvious way. By providing a cost-effective and commercially scalable method to treat produced or other compromised water (the terms being interchangeable) which may be released or reused for injection extraction techniques, Applicants have solved a particularly vexing problem that has at times been met with astonishment and even disbelief. It should be noted that the Applicant's system also contemplates the production of algal biomass and early bio-fuel feed-stock components as well as the capture and sequestration of carbon-dioxide and other compounds generated from the extraction of hydrocarbons allowing for value-added processes further enhancing the invention's utility and economic viability.

As to embodiments of the inventive technology that relate to techniques, systems, methods and apparatus for the growth of algae to capture and store atmospheric and industrial generated carbon dioxide ($CO_2$) and the like, as background it should be noted at the outset that the earth's atmosphere was created by and is regulated by micro organisms such as algae and bacteria. Originally life on earth evolved as sulfur eating bacteria that fed off hydrogen sulfide expelled from volcanic activity. As the bacteria increased in population, competition for available hydrogen caused a mutation that allowed the new organism to feed on hydrogen contained in water. The process known as photosynthesis uses sun energy to split water molecules and recombine the hydrogen with $CO_2$ that is a hydrated carbon termed a carbohydrate. The byproduct of this reaction is oxygen that is released into the environment. Due to the vast volume of water on earth the water splitting organisms, cyanobacteria and algae, flourished and created an atmosphere rich in oxygen. Oxygen is a highly toxic substance and very reactive with matter. This had the effect of driving anaerobic bacteria into hiding and gave way to a planet rich in plant life.

A second major evolutionary event occurred that allowed bacteria to metabolize plant matter to derive energy is known as oxidation-reduction. It is hypothesized that oxidizing bacteria became incorporated into cells in a symbiotic relationship and co-evolved in animal cells as mitochondria. Mitochondria may utilize oxygen to oxidize carbohydrates with one byproduct being $CO_2$ that is expelled into the atmosphere. For billions of years the earth's atmosphere was generally regulated by the planets inhabitants in this manner. As the planet warmed due to animal produced methane and $CO_2$, i.e., greenhouse gas, levels rising, terrestrial plants and oceanic algae would bloom. As carbon was captured by plants and algae, GHG levels would decrease and planetary temperatures would fall. The variance in atmospheric oxygen, 20.8%, and $CO_2$ ~1% remained relatively stable as the planets microorganisms, working in a grand symphony, adjusted for changes in the sun's temperature to maintain life in the balance.

As organisms die and sink to the bottom of the seas carbon is pulled out of the atmosphere and stored in organic matter in the earth. Over millions of years this organic matter is converted into hydrocarbons, high in energy. Man has developed the current civilization and populations of seven billion individuals through the utilization of this stored carbon to fuel our lifestyle. However, an unintended consequence of this extraction and combustion of stored carbon is the release of $CO_2$ into the atmosphere, upsetting the balance that the planet's microorganisms have established. For example, CO2 is absorbed by the ocean leading to ocean acidification causing coral reef and shell fish decimation. This has lead in recent years to unprecedented rises in GHG causing global warming, climate instability and associated weather patterns that now are beginning to threaten the established ecosystems on earth as evidenced by rapidly melting polar ice and decimating coral reefs around the world.

It is estimated that direct carbon combustion for energy production generates more than 24 gigatons of $CO_2$ annually. As a result, atmospheric CO2 concentrations have risen from approximately 295 parts per million (ppm) to 380 ppm over the last 100 years, and have contributed substantially to global warming, climate change, and resultant biological extinctions.

The geo-political reality is that mankind will continue to extract and burn carbon in the form of oil, gas, coal and wood for as long as it lasts. This process is accelerating as new technologies are developed to more efficiently and economically utilize fossil fuel. Also, as deposits of fossil fuels decrease, competition for the remaining reserves increases. For this reason the strategic petroleum reserve (SPR) was created in the United States following the OPEC oil embargo in the seventies as a buffer against interruption of oil supplies in the US. The SPR consists of some billions of barrels of oil stored in salt formations in several sites in America. When needed they can be drawn down and theoretically replenished when the emergency passes. The theoretical capacity of the SPR is 36 days, although in reality it would take 160+ days to actually pump, refine and deliver the stored petroleum to the market. In recognition of the finite supply of fossil fuels, which may take millions of years to develop under natural conditions, the US Government has embarked on a plan to replace traditional oil and gas with biofuels. Legislation has been passed in recent years establishing the renewable fuels standard, which mandates percentages of our transportation fuel comes from biofuels. Biofuels may be produced from organic matter in a very short time span, which is in a matter of days rather than years. Early biofuels feed stocks may include corn and soybean oil. Advanced biofuels feedstocks under development may be derived from algae and cellulosic matter. However, a major problem with biofuels production is the gap between GHG production and commercial profitability. Current technology may utilize cheap energy derived from fossil fuels to cultivate, harvest, extract and convert biomass into fungible (drop in) fuel replacements. Efficiencies are not yet available to produce high energy dense liquid fuels to replace gasoline and diesel use economically.

The purpose of this methodology may be two-fold. First, it may be desirable to capture GHG rather than continue to emit them to the atmosphere in order to reduce carbon levels in the atmosphere and reduce planetary temperatures. Secondly, it may be desirable to increase strategic petroleum reserves.

While implementing elements may have been available, actual attempts to meet this need may have been lacking to some degree. This may have been due to a failure of those having ordinary skill in the art to fully appreciate or understand the nature of the problems and challenges involved. As a result of this lack of understanding, attempts to meet these long-felt needs may have failed to effectively solve one or more of the problems or challenges here identified. These attempts may even have led away from the technical directions taken by the present inventive technology and may even result in the achievements of the present inventive technology being considered to some degree an unexpected result of the approach taken by some in the field.

SUMMARY OF THE INVENTION

Embodiments of the current inventive technology include, for example systems, methods and apparatus for algae-based treatment of challenged water, methods of algae-based treatment of produced water, methods of growing algae in challenged water, methods of algal biomass generation using produced water, methods of algae-based treatment of water, as well as subterranean storage of whole algae, algae lipids and de-lipidated algae as well as the generation of extractable algae-oil.

Certain embodiments may include a variety of elements and steps that may be combined in various permutations and combinations as well as series. For example, certain embodiments may include some of the following elements: transporting challenged water to a location suitable for algae-based treatment. Pre-conditioning said challenged water which may comprise one of more of the following steps: desalinating said challenged water; separating said challenged water; filtering said challenged water; adjusting the pH of said challenged water to a target level; flocculating said challenged water; and scrubbing said challenged water. Allowing algal growth in seed water to a pre-determined threshold for example through the steps of establishing a volume of said seed water ($X_1$) in at least one algae conditioning reservoir; and inoculating said seed water or perhaps a hybrid mix of challenged and seed water. It should be noted that in certain embodiments seed water may include fresh, challenged, produced, pre-conditioned or a combination of one of more of these water types. Propagating conditioned algae growth in said algae conditioning reservoir perhaps through one or more of the following steps, including but not limited to: adding a discrete amount of said pre-conditioned challenged water ($Y_1$) to said algae conditioning reservoir generating a hybrid water mix ($Y_1, X_1$) of seed and pre-conditioned challenged water; agitating said hybrid water mix to promote algal growth; adjusting the pH of said hybrid water mix to promote algal growth; supplementing said hybrid water mix with nutrients or algal growth promoting components, the terms being generally interchangeable, to promote algal growth; allowing accommodated algal growth in said hybrid water mix to a pre-determined threshold; step-wise altering the composition of said seed water and said pre-conditioned challenged water forming a series of hybrid water mixes ($Y_x, X_x$) of seed and pre-conditioned challenged water; step-wise supplementing said hybrid water mix with algal growth promoting components; allowing accommodated algal growth after each step-wise composition and/or component change; and continuing step-wise composition and/or component change until a target conditioned growth profile is achieved.

Notably, in certain embodiments a target conditioned growth profile may be the combination of different fresh, challenged, produced, pre-conditioned, hybrid water types. Such combinations may be based on percentage or volume distributions. Further embodiments may include additionally, or individually the combination of different nutrients ($N_{x\ or}$ $T_x$) as well as time. Multiple combinations and permutations of conditioned growth profiles may be contemplated in this invention. Such conditioned growth profiles may be specific to certain algal strains, types of challenged water, specific to a region or, for example a specific well and the like. Generation of a conditioned growth profile may be automated or accomplished manually and may further be a dynamic, step-wise or pre-determined process.

In some embodiments, the inventive technology contemplates, for example the step of maintaining algal growth at a target conditioned growth profile to generate a target level of algal biomass; as well as removing challenged water contaminate components through algal metabolization and/or sequestration; harvesting said algal biomass from said algae conditioning reservoir; removing algal treated water from said conditioning reservoir; and transporting said treated water for secondary disposition.

Certain embodiments may further include the steps of transporting water to a location suitable for algae-based treatment; collecting said water in at least one reservoir; inoculating said water with at least one conditioned strain of algae; propagating algal growth said water; removing water contaminate components through algal metabolization and/or sequestration; removing algal treated water from said reservoir; and transporting said treated water for secondary disposition.

It should also be noted that a variety of types and genus of algae are contemplated in the inventive technology. Such types include, but are not limited to: Diatoms; *Chlorophyta; Euglenophyta; Dinoflagellata; Chrysophyta; Phaeophyta; Rhodophyta*; and *Cyanobacteria*. In some embodiments, the term algae may also refer generally to bacteria, archaea, extremophiles as well as small single and multi-cell organisms.

DETAILED DESCRIPTION OF THE INVENTIVE TECHNOLOGY

The present invention includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application. Finally, while the invention has been initially described in method-oriented terminology, each element of the method implicitly may be performed by a device. Apparatus claims may not only be included for the device described, but also method or process claims may be included to address the functions the invention and each element performs. Neither the description nor the terminology is intended to limit the scope of the claims that will be included in any subsequent patent application.

A noted previously, the term challenged water is broadly construed and may include a variety of different water types, including but not limited to: hydrocarbon contaminated water; diluted challenged water; sea-water; saline water; brackish water; constituent water; wastewater; injection-water; industrial wastewater; well water; natural wastewater; treated water; un-treated water; water prohibitive for algal growth; municipal wastewater; agricultural wastewater; potash mining wastewater; mining waste water; hybrid mix of challenged waters; BTEX contaminated water; nitrite contaminated water; cyanide contaminated water; radioactive contaminated water; sediment contaminated water; sulfide contaminated water; hydrogen sulfide contaminated water; hydraulic fracturing waste water; and oil and gas extraction water.

Figure 1:
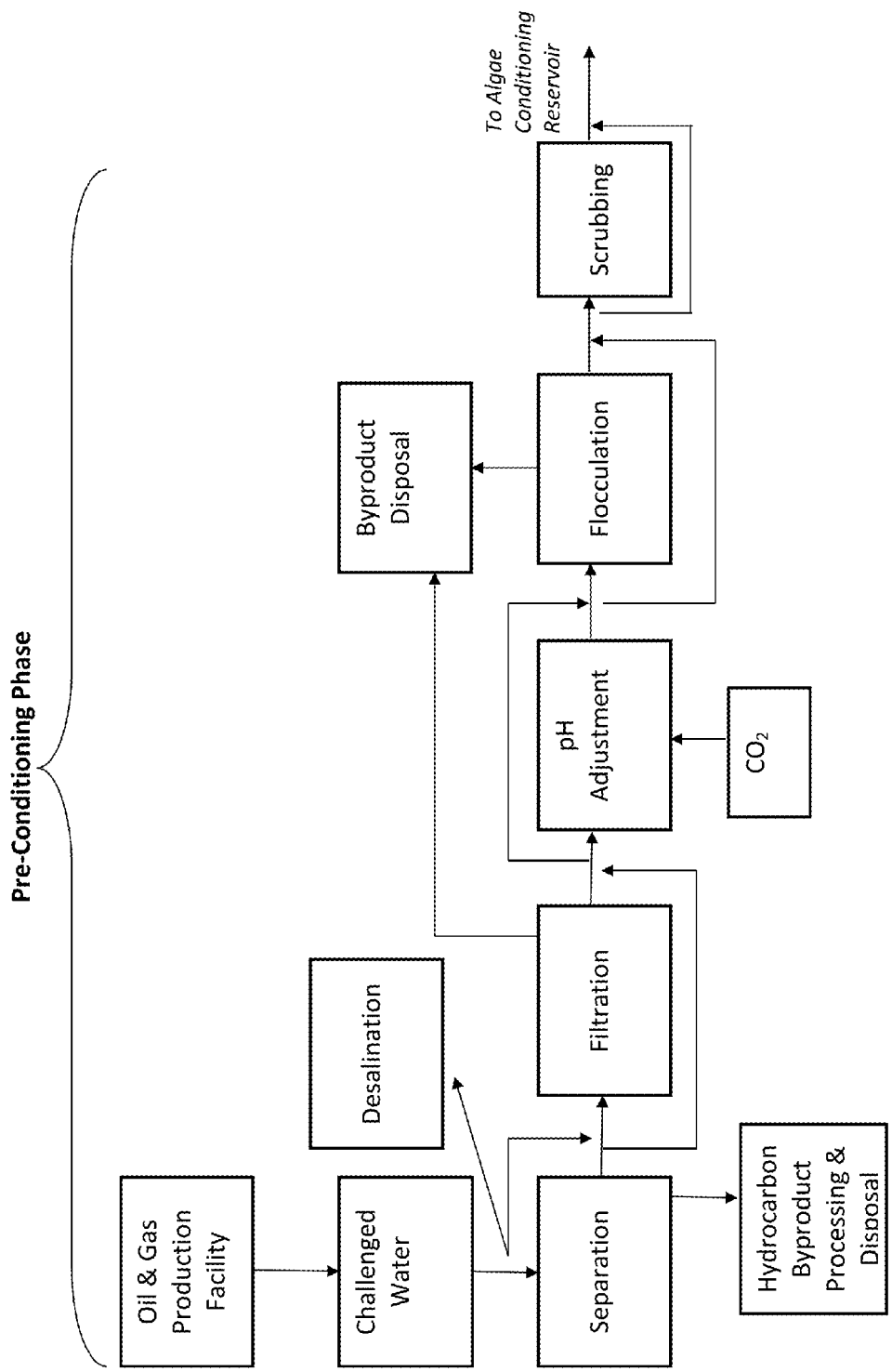
FIG. 1: is a schematic view of the pre-conditioning phase of an algae-based treatment of produced water in one embodiment thereof.
Figure 2:
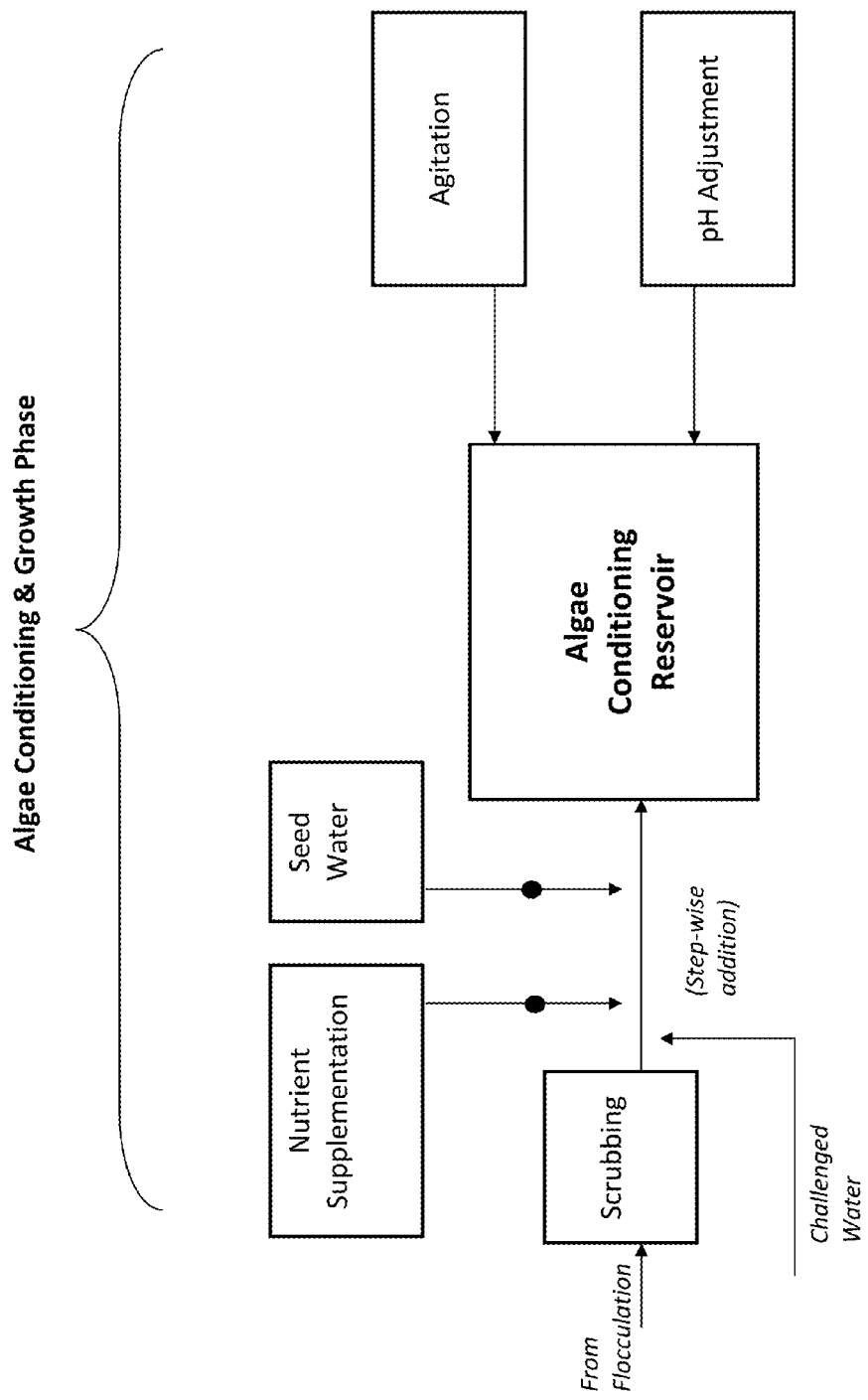
FIG. 2: is a schematic view of the algae conditioning and growth phase of an algae-based treatment of produced water in one embodiment thereof.
Figure 3:
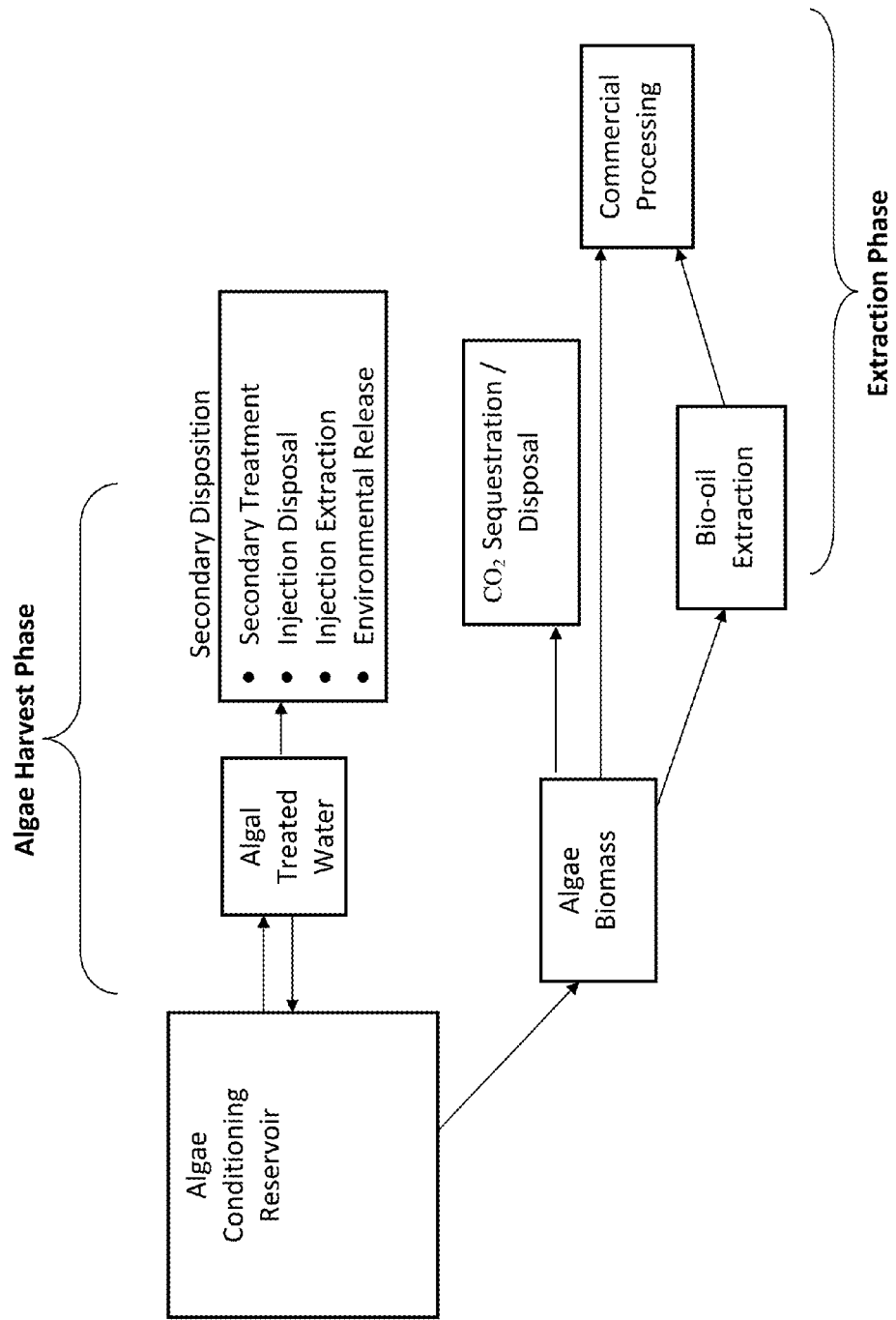
FIG. 3: is a schematic view of the algae harvesting and extraction phase of an algae-based treatment of produced water in one embodiment thereof.

As generally shown in FIGS. 1-3, one embodiment of the current inventive technology encompasses an algae-based system for the treatment of, for example produced water. As discussed above, produced water—which is normally prohibitively toxic to allow algae growth—may be produced through various activities related to the underground extraction of hydrocarbons such as oil and gas. In this regard, the inventive technology may be situated in close proximity to new and/or existing oil and gas wells and/or production facilities. Produced or other compromised water may also be routed and/or transported through new or existing pipeline/irrigation systems to a specific location for algae-based treatment. It should be noted that the term pipeline, and/or irrigation system is used generally to describe any means of transporting a particular material. In some instances such a term may encompass such methods as train or automobile transport or even manual movement of a one material to another location and the like.

As shown in FIG. 1, in one embodiment produced water from an oil and gas production facility may undergo an initial "pre-conditioning phase." In this phase, several physical and/or chemical treatments may be initially applied to the produced water to "pre-condition" it for algal growth. In some embodiments, as discussed above, produced or otherwise compromised water may contain variable levels of constituents, such as salts. In some embodiments, salt concentrations may be prohibitively high and as such, the produced or compromised water may undergo a desalination process. Such processes may include, for example filtration, reverse osmosis based applications, precipitation techniques known in the industry, concentration and evaporation techniques known in the industry and the like.

As noted above, produced water typically contains residual hydrocarbons which may be separated, with the oil byproducts being extracted and possibly sold or refined for additional commercial uses. Such separation may typically be accomplished through a variety of known technologies and processes, including, but not limited to: gravity separation (i.e. skimmers and corrugated plate interceptors); gas flotation; coalescence through demulsifiers; chemically assisted separation; API separators; hydrocyclones; electrostatic separators; plate separators and the like. Again referring to FIG. 1, the separated produced water may further be filtered to remove additional contaminants such as excess sedimentation and/or other solids. Again, various types of filtration methods and systems that are known within the industry are specifically contemplated including, but not limited to: sand-carbon filtration; membrane filtration; ceramic filtration and the like. It should be noted that in some instances such separation and filtration steps may be accomplished independently, in the same or disparate locations.

As part of the pre-conditioning phase, it may be desired to alter the pH of the produced water to a target or optimized pH conclusive to algal growth. This target pH may be determined based on the type(s) or stage(s) of anticipated algae that will be used in the treatment process. This pH adjustment may be accomplished through, for example, the application of gaseous carbon-dioxide ($CO_2$) or the addition of neutralizing, or pH altering chemicals. In one embodiment, gaseous $CO_2$ may be bubbled through the produced water altering the pH to a desired level. This pH targeting process may be automated such that the produced water is periodically and/or continuously evaluated by an appropriate sensor and control system varying the amount of $CO_2$ added to the system at any given moment according to a pre-determined target. It should be noted that the use of a $CO_2$ sparging system is merely exemplary and in no way should be construed as limiting as any known and appropriate method for the pH adjustment of water may be adapted to the current invention. Moreover, it should be noted that the term sparging may generally refer to the application of $CO_2$ to waste to, for example alter pH or act as a carbon nutrient component source. It should be noted that this step of pH adjustment may be accomplished at any point and/or continuously during the pre-conditioning phase.

Returning again to FIG. 1, during the pre-conditioning phase the produced or other compromised water may undergo flocculation to further remove or reduce constituents such as remaining oil and/or other contaminants. In one embodiment the produced water may be transferred to a coagulation tank where clarifying agents such as flocculants and coagulators may be injected into the produced water. These clarifying agents may serve the purpose of increasing the size of any oil droplets in the water to facilitate later separation. A possible flocculant may include a polymer that serves to make the oil droplets larger. A possible coagulant, which may be a metal salt or a low molecular weight organic compound, may be used such as to remove the electrical charge from any formed oil droplets allowing them to coagulate into larger and more easily separated particles. The produced or other water may be passed into a flotation tank where the addition of a gas may allow the oil to combine with said gas which may facilitate the separation of contaminants from the water. The water can then be discharged for additional treatment and any added flocculation and coagulation chemicals may be returned to the production process. Again, it should be noted that such flocculation example is merely exemplary and a variety of known flocculation systems and methods are contemplated within this invention.

In some embodiments, during the pre-conditioning phase, the produced water may pass through a scrubber to reduce and/or remove certain chemical compounds that act as algae growth inhibitors. Such compounds may include sulfides, BTEX, nitrites, cyanides, and/or other organic materials. In certain embodiments such step may be accomplished with application of ultra-violet generated ozone or other similar ozone based water treatment system. In such a step, ultra-violet radiation may be used to generate a supply of ozone ($O_3^+$) which may be bubbled or otherwise applied to the produced water. The presence of ozone in the produced water in turn may create hydroxide ions ($OH^-$) and hydrogen ions ($H^+$) that may degrade organic, heavy metal and otherwise undesired compounds as noted above. Such example is not limiting on the current invention, as a variety of different systems and methods may be adapted to the current technology. In some embodiments, produced or other compromised water may be treated with individual and/or combinations of various catalysts and/or oxidation techniques known within the industry, as well perhaps desiccants such as zeolite and/or oil-philic treatments such as crushed acorn shells. As shown in FIG. 1, each of the steps of the pre-conditioning phase may be accomplished independently or in series, while under other circumstances certain steps may be omitted entirely or even accomplished off-site as well as in-situ. Furthermore, as will be shown below, the conditioned selection of algal strains, combinations and/or individual genetic variants that may be grown in normally toxic produced or other water which may allow for less, or even no produced water pre-conditioning.

Figure 8:
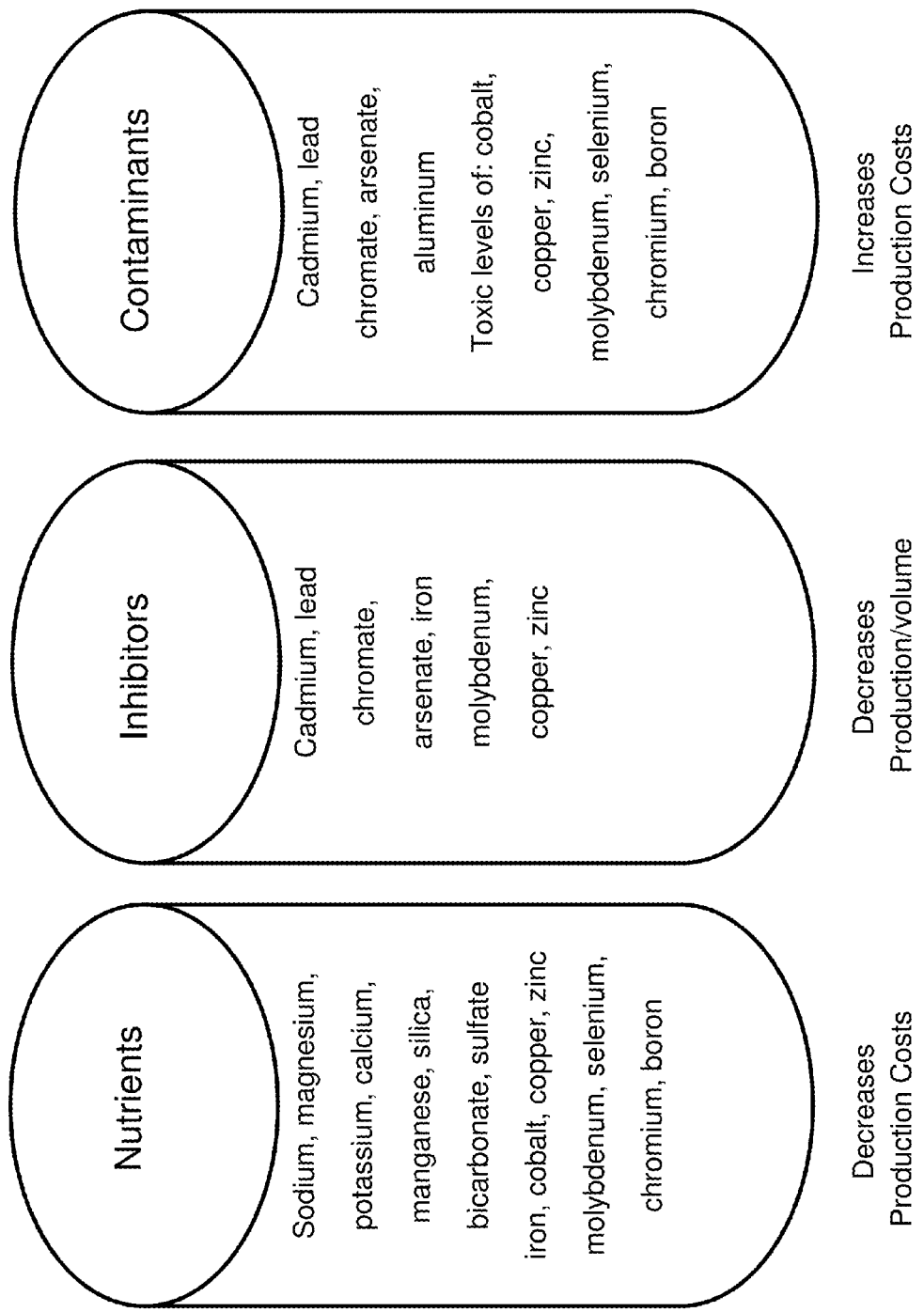
FIG. 8: is an initial exemplary listing of various contaminants and or constituents that may be found in challenged water that many be used as nutrients for algae growth at certain levels.

Now turning to FIG. 2, after the completion of the pre-conditioning stage, the produced water may be directed to an algae growth reservoir. It should be noted that such a reservoir may encompass any suitable container or enclosure capable of holding the produced water. In a preferred embodiment such algae growth reservoir may include artificial and/or natural surface ponds as well as perhaps, an algae incubator and/or photobioreactor. It should be noted that in a preferred embodiment an algae growth reservoir may include raceways or other equivalent devices to facilitative agitation of the produced water allowing for even distribution of nutrients, solar exposure and gas-components throughout the growth reservoir. Such agitation may be continuous and may be even automated perhaps even based on an appropriate sensor and controller apparatus that may be responsive to a desired output such as pH, or turbidity and the like. Referring to FIG. 2, some embodiments of the current inventive technology include the step-wise conditioned growth of algae in produced water generated from the pre-conditioning stage. In a preferred embodiment, nutrients may be added to the produced water to facilitate algal growth. It should be noted that the produced water may already contain many beneficial nutrients for algal growth not present in fresh water sources. As such, one of the inventive features of the current technology may be the ability to utilize such existing nutrients, such as carbon and other trace components or constituents. As generally shown in FIG. 8, certain nutrients present in produce or compromised water, at certain levels may acts as nutrients for growing algae. As such, the ability to utilized produced or compromised water decreases the need to nutrient supplementation which may be required for algal growth in other industry process. Applicants have overcome this limitation. However, as noted above, the constituent content of produced or compromised water may vary from region to region, and even well to well in some instance. As generally shown in FIG. 8 at certain concentrations such constituents may acts as algae growth inhibitors, and at still other mostly higher levels such constituents may in fact be toxic to algae growth. This variability may be further compounded when produced water from disparate sources is combined. As such, one advantage of the current invention, as discussed below, is that it may allow for the conditioned growth of algae in produced or compromised water that may normally be inhibited or even toxic.

Figure 7:
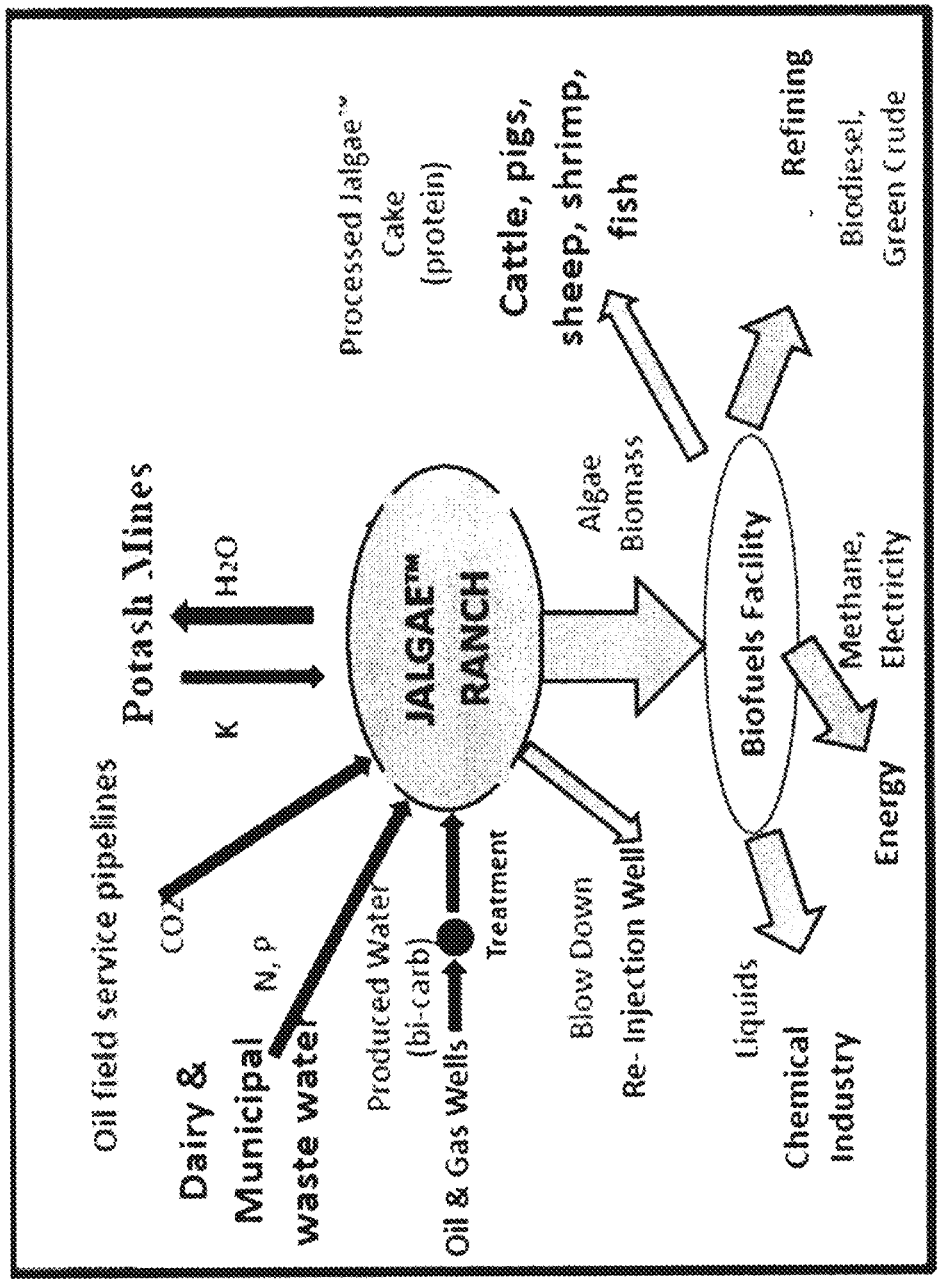
FIG. 7: is an exemplary view of an algae based growth and water treatment system in one embodiment.

As generally in FIG. 7-8, additional nutrient supplementation for algae growth, such as nitrogen and phosphorus may be drawn from municipal wastewater, dairy farm wastewater, as well as potassium-rich water from potash mining operations, or even from other targeted sources. Such nutrients may be added in various fixed or variable volumes and are represented herein as $N_{1-3}$. Additional variables, such as sun exposure may also be quantified by unit or time and are represented by $T_1$ herein. A such, in some embodiments, the current technology may take advantage of existing industrial or other waste stream nutrients which might normally would need to be treated prior to environmental release, or may go un- or under-utilized. Such a value-added proposition may allow the current invention to be coupled to existing or planned industrial or other facilities that may in-turn divert their waste streams for treatment. As generally shown in FIG. 7, the current invention may not only decrease/use waste from, for example up-stream industrial processes, but also may turn once non-commercial waste into a viable commercial product.

It should be noted at this point, that one aspect of the current invention may include the selection and optimization of treatment process based, for example on the make-up of the produced or compromised water used in the process. As noted, the constituents of such water may vary widely, especially when disparate sources are mixed. As such, in some embodiments, the produced or compromised water may undergo an initial test to evaluate the constituent profile. Based on this analysis, the various treatment steps as well as perhaps algae strains utilized may be selectively varied to generate optimal algae growth and water treatment goals. Such selective variation may be by step, or time, or may involve the addition or deletion of a treatment step. In this regard, in some embodiments it may be possible to selectively pre-condition produced or compromised water, while not stripping it of its pre-existing nutrients which may used to promoted and enhance algal growth.

Figure 4:
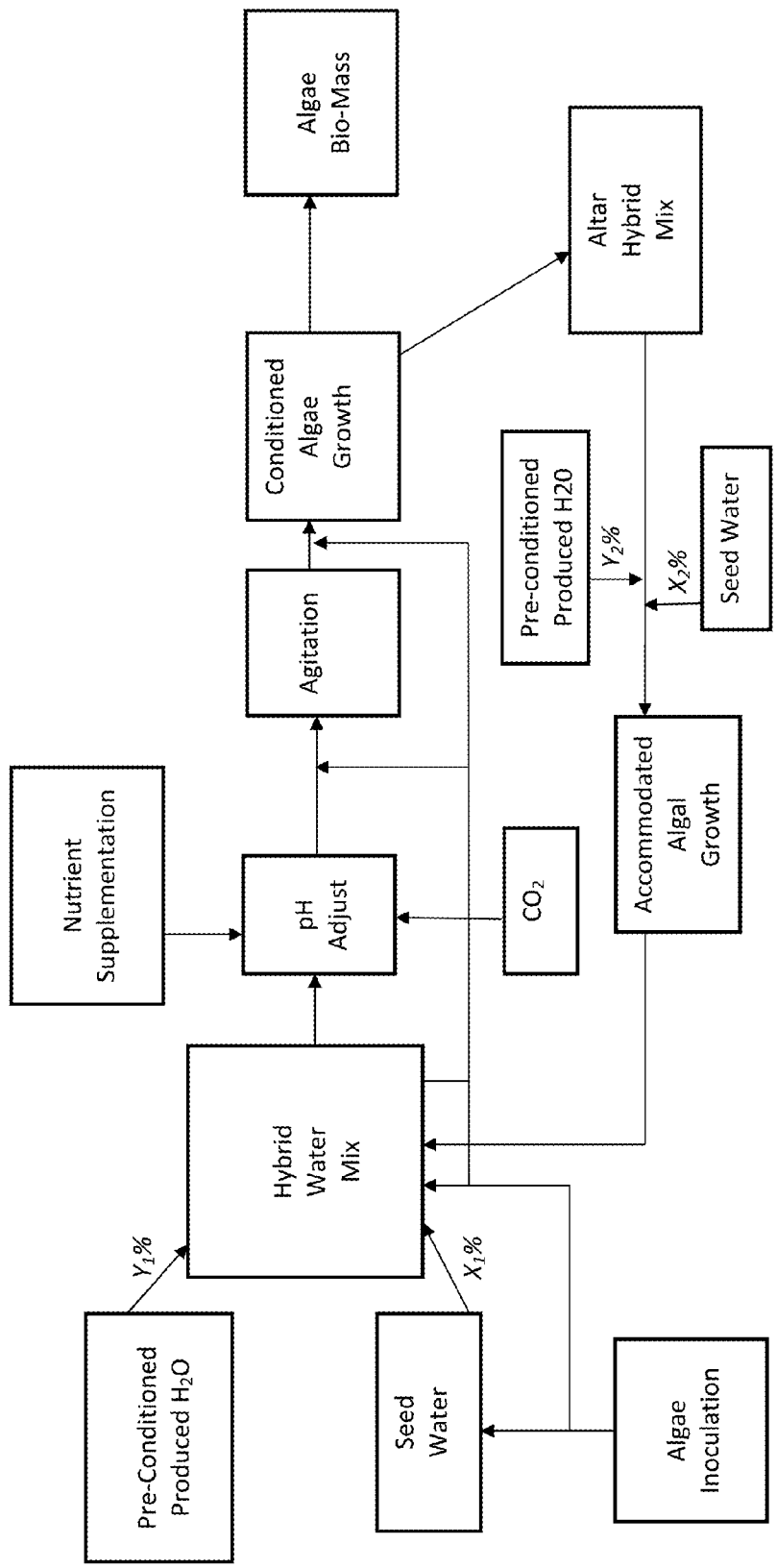
FIG. 4: is a schematic view of the step-wise algae conditioning phase of an algae-based treatment of produced water in one embodiment thereof.

As show in FIGS. 2 and 4, in a preferred embodiment the algae conditioning reservoir may initially contain 100% fresh, or at least substantially fresh water represented here as $X_1$. It should be noted that such seed water may be derived from a variety of sources and may generally be considered water sufficient to sustain algal growth. This initial seed water may again, be supplemented with nutrients and $CO_2$ to promote algal growth as well as achieve a desired pH. This seed water may be inoculated with a desired algae strain, or proprietary mix of algae strains to initiate algal growth. Such inoculation may be artificial, or natural, such as through the natural exposure to algal strains in the environment. After allowing algal growth for either a pre-determined period, or until a pre-determined threshold measure of algal growth is met, a discrete volume of produced water from the pre-conditioning phase represented here as $Y_1$ may be added to the algae conditioning reservoir to establish a hybrid mix of fresh and produced water. Similar to the above referenced steps, algal growth may be allowed to proceed in the algae conditioning reservoir containing the hybrid mix of fresh and produced water. The produced water, while having been pre-conditioned may still contain compounds that may be generally toxic to and/or inhibit normal algal growth. In this respect, strains and or species that are not able—or not optimized—to grow in the presence of such conditions are inhibited from growing, or grow at a much slower rate being outcompeted by the more robust strains. This step-wise replacement of fresh water with produced water from the pre-conditioning phase followed by the above described "accommodation" phase—allowing robust algae strain selection and outgrowth—may proceed until produced water has replaced or significantly diluted, here represented as being 0%, the fresh water in the algae conditioning reservoir. For example, in an exemplary model such step-wise conditioned growth may include the following "conditioned growth" profile:

may supplement challenged, seed, fresh or any other type of water contemplated with one or more of the following: supplementing with potassium; supplementing with nitrogen; supplementing with phosphorus; supplementing with sodium; supplementing with magnesium; supplementing with calcium; supplementing with manganese; supplementing with silica; supplementing with bicarbonate; supplementing with sulfate; supplementing with iron; supplementing with cobalt; supplementing with copper; supplementing with selenium; supplementing with chromium; supplementing with boron; supplementing with carbon; supplementing with sunlight. It should further be noted that the term unit is also variable, depending on the desired level, such as determined for example through evaluating the constituent profile of said seed, hybrid water, and/or challenged water, as well as considering the selected or optimized strain(s) of algae that may be utilized. It should further be noted that the term optimized, may include conditioned strain(s) of algae, naturally selected strain(s) of algae, strain(s) of algae that grow at a higher than normal rate, genetically engineered strain(s) of algae, strains of algae that work cooperatively, or strain(s) of algae that have a certain characteristic, such as the sequestration of a certain constituent contaminant, or component utilization and the like.

After such conditioning, algal growth may continue through a growth phase and eventually be harvested for commercial uses as will be discussed below. In some embodiments this continuous growth may be dynamically adjusted further by the addition of less or non-treated produced water ($Z_1$) in a similar step-wise fashion allowing conditioned algal

| Untreated Produced Water | Seed Water | Pre-conditioned Produced Water | Time/ Hours | Time/ Days | $N_1$ | $N_2$ | $N_3$ | $T_1$ | CO2 |
|---|---|---|---|---|---|---|---|---|---|
| $Z_1 = 0\%$ | $X_1 = 100\%$ | $Y_1 = 0\%$ | 3 | 1-50 | 1 unit | 1 unit | 1 unit | 1 unit | 1 unit |
| $Z_2 = 0\%$ | $X_2 = 90\%$ | $Y_2 = 10\%$ | 6 | 1-50 | 2 unit | 2 unit | 2 unit | 1 unit | 2 unit |
| $Z_3 = 0\%$ | $X_3 = 80\%$ | $Y_3 = 20\%$ | 9 | 1-50 | 3 unit | 3 unit | 3 unit | 1 unit | 3 unit |
| $Z_4 = 0\%$ | $X_4 = 70\%$ | $Y_4 = 30\%$ | 10 | 1-50 | 4 unit | 4 unit | 4 unit | 1 unit | 4 unit |
| $Z_5 = 0\%$ | $X_5 = 60\%$ | $Y_5 = 40\%$ | 11 | 1-50 | 5 unit | 5 unit | 5 unit | 1 unit | 5 unit |
| $Z_6 = 0\%$ | $X_6 = 50\%$ | $Y_6 = 50\%$ | 12 | 1-50 | 6 unit | 6 unit | 6 unit | 1 unit | 6 unit |
| $Z_7 = 0\%$ | $X_7 = 40\%$ | $Y_7 = 60\%$ | 13 | 1-50 | 7 unit | 7 unit | 7 unit | 1 unit | 7 unit |
| $Z_8 = 0\%$ | $X_8 = 30\%$ | $Y_8 = 70\%$ | 14 | 1-50 | 8 unit | 8 unit | 8 unit | 1 unit | 8 unit |
| $Z_9 = 0\%$ | $X_9 = 20\%$ | $Y_9 = 80\%$ | 15 | 1-50 | 9 unit | 9 unit | 9 unit | 1 unit | 9 unit |
| $Z_{10} = 10\%$ | $X_{10} = 10\%$ | $Y_{10} = 80\%$ | 16 | 1-50 | 10 unit | 10 unit | 10 unit | 1 unit | 10 unit |
| $Z_{11} = 15\%$ | $X_{11} = 5\%$ | $Y_{11} = 80\%$ | 17 | 1-50 | 11 unit | 11 unit | 11 unit | 1 unit | 11 unit |
| $Z_{12} = 20\%$ | $X_{12} = 0\%$ | $Y_{12} = 80\%$ | 18 | 1-50 | 11 unit | 11 unit | 11 unit | 1 unit | 11 unit |
| $Z_{13} = 30\%$ | $X_{13} = 0\%$ | $Y_{13} = 20\%$ | 19 | 1-50 | 11 unit | 11 unit | 11 unit | 1 unit | 11 unit |
| $Z_{14} = 40\%$ | $X_{14} = 0\%$ | $Y_{14} = 30\%$ | 20 | 1-50 | 11 unit | 11 unit | 11 unit | 1 unit | 11 unit |
| $Z_{15} = 50\%$ | $X_{15} = 0\%$ | $Y_{15} = 50\%$ | 21 | 1-50 | 11 unit | 11 unit | 11 unit | 1 unit | 11 unit |
| $Z_{16} = 60\%$ | $X_{16} = 0\%$ | $Y_{16} = 40\%$ | 22 | 1-50 | 11 unit | 11 unit | 11 unit | 1 unit | 11 unit |
| $Z_{17} = 70\%$ | $X_{17} = 0\%$ | $Y_{17} = 30\%$ | 23 | 1-50 | 11 unit | 11 unit | 11 unit | 1 unit | 11 unit |
| $Z_{18} = 80\%$ | $X_{18} = 0\%$ | $Y_{18} = 20\%$ | 24 | 1-50 | 11 unit | 11 unit | 11 unit | 1 unit | 11 unit |
| $Z_{19} = 90\%$ | $X_{19} = 0\%$ | $Y_{19} = 10\%$ | 25 | 1-50 | 11 unit | 11 unit | 11 unit | 1 unit | 11 unit |
| $Z_{20} = 100\%$ | $X_{20} = 0\%$ | $Y_{20} = 0\%$ | $\infty$ | $\infty$ | 11 unit | 11 unit | 11 unit | 1 unit | 11 unit |

It should be noted that the time denoted at each successive stage above is merely exemplary and may be variable of encompass a range. Indeed, it is contemplated that for example any one stage may encompass a specific time period, or a range of for example 2-3 days at $X_1=90\%$ and $Y_1=10\%$ and $Z_1=0\%$, however it may be anywhere from 1-50 days for example in other embodiments, or even 100 days or even indefinitely. In another example, $X_1=0\%$ and $Y_1=10\%$ and $Z_1=90\%$, for a $T_{11}$ of 5 days, with 1 unit of $N_1$, 3 units of $N_2$, units of $N_3$, and 11 units of $N_4$. Again, such example is merely illustrative of the many combinations and permutations contemplated within the ranges claimed.

For example, various N compounds may be considered. For example, in some embodiments, the inventive technology growth in produced water requiring less pre-conditioning. In additional embodiments, algae strains force genetically modified or "conditioned" through this process may be used as feed-stock to inoculate separate growth reservoirs that may be, for example fed a supply of solely produced or other compromised water that has or even has not undergone any steps of pre-conditioning or other treatments. Finally, in some embodiments, algae may be grown in produced or other compromised water without either pre-conditioning or conditioned growth.

It should be noted at the outset that the percentages of fresh and produced water are merely illustrative and in no way limiting on the current invention. In addition, it is both contemplated that in some embodiments both fresh water and pre-conditioned produced water are added in their respective amounts to an algae conditioning reservoir, while in still further embodiments, said algae conditioning reservoir contains a discrete volume of fresh water and pre-conditioned produced water is added in a step-wise manner to produce the desired percentage mix described above or otherwise. In still further embodiments, a fixed or variable volume of fresh water may be drained away and replaced by an equal volume of pre-conditioned produced or other water establishing the percentage mix described above or otherwise. In alternative embodiments, said mix of fresh and produced water is not based on percentages but the step-wise addition of produced water by volume unit. Regardless of the manner in which the hybrid pre-conditioned/fresh water mix is obtained, this "conditioned" growth can allow for industrial scale genetic self-selection and out-growth of genetically robust algae strains or variants capable of thriving in the presence of the contaminants inherent in produced water or in a particular environment. In certain embodiments of the inventive technology a conditioned strain of algae may include a strain of algae that has previously undergone conditioned growth. In other embodiments a conditioned strain of algae may include a genetically alter algal strain having resistance to inhibitors, for example found in challenged water. In other embodiments, a conditioned strain of algae may be a naturally occurring strain that has been isolated as having the ability to grow in challenged, hybrid, preconditioned or produced water and the like. Finally, conditioned strain of algae may be a variety of strains having any of the above reference characteristic but may further cooperatively interact to allow growth in, for example challenged, hybrid, preconditioned or produced water and the like. In some embodiments, such forced genetic adaptation may result in the increase in the synthesizing of high-affinity, heavy metal binding molecules, such as for example phytochelatin in response to toxic heavy metal concentrations. Such genetic variants may allow for increased, or more efficient phytoremediation.

Additional benefits of such conditioned growth may allow for the selection and cultivation of algae strains, proprietary strain combinations and/or genetic variants adapted to successfully grow in the presence of produced or other water. Such force genetically adapted strains of combinations of strains may acts as feedstock for re-inoculation of the conditioned-growth phase, as well as for inoculation in other algae growth reservoir and/or reservoir. As such, the inventive technology over time allows the system to become continuously genetically adaptive allowing for more and more robust strains to be isolated and cultivated allowing lower percentages of fresh water to be used in the conditioned growth phase. Additional benefits of such conditioned growth are the ability to conduct less pre-conditioning treatments allowing for significant time, water and cost savings. Ultimately, algal strains or combinations may be isolated that grow in pre-conditioned—or even un-conditioned—produced water without any step-wise dilution of fresh water.

It should be noted that the conditioned growth described above can allow for genetically robust algae strains to be continuously selected and cultivated. In some instances such force genetically adaptive strains may have specific genetic mutations—whether direct or of the epi-genetic type—allowing, for example a more efficient sequestration of heavy metals such as cadmium, or the detoxification of certain sulfides and the like. In other examples, such mutations may arise in the conditioning process and may be selected and cultivated so as to be adapted to the specific contaminant profiles of the produced water from a particular region or basin. In this embodiment, the invention allows for the continual genetic optimization of algae strains for the treatment of produced water that may be adaptable not only to a specific region, but even to the produced water profile of a specific facility or even individual well. In further embodiments, pre-determined algae strains and/or combinations of strains that may be known to be indigenous to certain regions may be selected and conditioned as generally described above. In this manner, in certain embodiments a variety of algae strains and combinations may be selected and genetically adapted such that they may be specialized to more efficiently grow and thrive in certain regions.

Additional force genetic selection through such conditioned growth may result in the isolation of other algae strains having specific desired metabolic characteristics such a lipid membrane content, $CO_2$ uptake ability, sulfide resistance and the like. Such conditioned strains may further be used to identify genetic targets for enhanced algal growth in the presence of produced water and/or other growth inhibitors. Such strains may be analyzed on a macro-level utilizing microarray and rapid sequencing technologies to identify target genes which may be later engineered back into certain strains to impart enhanced growth and treatment profiles. Such conditioned growth may also be automated and adaptive such that appropriate sensors measuring certain quantifiable measurements such as algal growth, pH, turbidity, density etc. . . . may automatically adjust the mix of fresh and produced water to optimize algal growth and conditioning. Of course, it should be noted that the individual steps described above may be executed in sequence or independently and are merely exemplary to the overall process. In addition, such automation may allow for dynamic or continual adjustment of each step in the process, or even the addition or deletion of a specific or specific steps as desired to optimize the system. Of course, such optimization may be accomplished manually as well. In one example, the evaluation of the constituent profile of the water to be utilized may include the automated sampling and testing of the water at various points to determine for example the waters contaminant levels, or nutrient component levels and the like. Again, such evaluation of the constituent profile may be accomplished manually as well.

Figure 5:
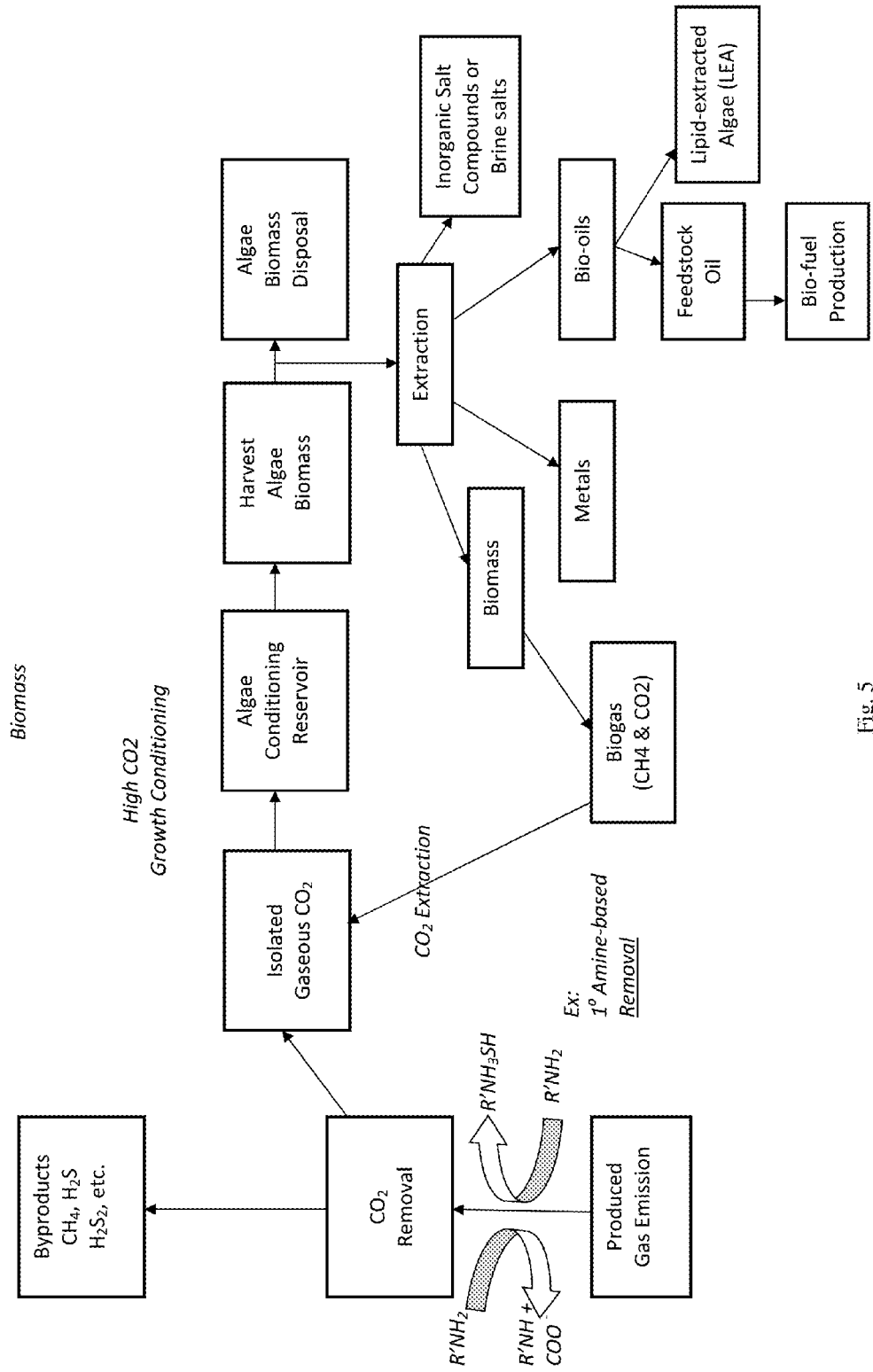
FIG. 5: is a schematic view of an algae-based capture and sequestration of carbon-dioxide utilizing produced water in one embodiment thereof.

As shown generally in FIGS. 3 and 5, additional embodiments of the invention allow for the harvesting of valuable commercial end-products from the conditioned growth phase. As shown, algae biomass from the conditioning reservoir may be harvested for use in livestock feeds and as fuel in ethanol, dry coal and/or methane power generation facilities, generally referred to industrial feedstock(s). In addition such algae biomass may be further processed to produce, for example, feedstock "bio-oils" which may be processed for use in bio-diesel, cosmetics and even pharmaceuticals. In addition, lipid-extracted algae (LEA) containing largely carbohydrates, proteins and Omega-3 fatty acids may be extracted and sold as a commercial by-product of the process.

Additionally, during the algal growth phase, various contaminants such as inorganic salt compounds, such as potassium salts, metals such as for example, iron, nickel, chromium, other contaminants such as arsenic, methane and ammonia may be naturally taken up, metabolized, chemically altered, rendered inert, digested and/or biologically incorporated by the algae incorporated, for example in their lipid membranes. Such varied processes being generally referred to as algal metabolization and/or sequestration. Such trace elements and metals may even be extracted from the algae biomass, through for example a weak acid treatment, and then perhaps processed for industrial uses. As such, in some embodiments of the invention the conditioned algae growth may allow for the removal of common produced or other water contaminants creating usable water that may be transported for additional treatment, perhaps prior to being released directly back into the environment. In some instances such treated produced water may be transported back to an injection well site to be deposited into a produced water disposal well or even re-used in further water injection extraction processes. This last option may be particularly attractive as injection-based extraction methods increase hydrocarbon recovery yields, however are often limited by the availability of appropriate water resources. In addition, the presence of suspended oils, solids and dissolved gases as well as many of the contaminants described above may decrease the injectivity of produced water. The inventive technology has overcome such concerns as it provides a safe and commercially scalable algae-based treatment system that limits use of existing fresh water reservoirs, while simultaneously allowing for a positive feed-back operation to re-use produced water at injection well sites to improve hydrocarbon yields.

In additional embodiment, the inventive technology may allow for the desalination of produced or otherwise challenged water. In some embodiments, an algae containing reservoir may also acts as an evaporation pond. In a preferred embodiment, through the conditioned growth of algae in produced or otherwise compromised water to generate specialized strains capable at growth in high salt concentrations, inorganic salts can be concentrated in such evaporation reservoirs and concentrated for later harvest and commercial use. For example, typical seawater may have a salt concentration of approximately 33,000 ppm. At this level certain salt-water algae species may grow successfully. However, produced or compromised water may have a salt concentration of approximately 44,000 ppm where algae growth may be generally inhibited. As such, in some embodiments, high-salt tolerant algae strains may be conditioned to grown successfully in high salt containing water, perhaps even past the normal thresholds of growth inhibition. In such an embodiment, the salt in such produced or compromised water may be concentrated in the water using evaporation and concentration techniques known in the industry, perhaps producing brine or other salt products that may be harvested and commercially sold.

Referring to FIG. 5, certain embodiments of the inventive technology include the capture of $CO_2$ from various industrial processes, for example gas emissions from energy production facilities such as coal or natural gas electrical generation facilities, or $CO_2$ from a gas cleaning facility. Such captured $CO_2$ may be used to: 1) alter the pH of produced water during the pre-conditioning and conditioned growth phase; 2) supplement algal growth by creating a high $CO_2$ environment, for example in the algae conditioning reservoir with the supplemented $CO_2$ acting as a natural carbon source rather than carbohydrates or other organic material; and 3) re-capture and sequester $CO_2$ in algae biomass for later disposal.

For example, as shown in FIG. 5, $CO_2$ and hydrogen sulfide ($H_2S$) may be isolated such as through a traditional amine capture processes known within the industry. For example, typical amines such as MEA (monoethanolamine); Diethanolamine (DEA); AMP (2-Amino-2-methylpropanol), MDEA (methyldiethanolamine) and PIPA (Piperazine) may be utilized at specific concentrations to capture and isolate $CO_2$ from produced gas emissions. Such a typical amine gas treating process may include an absorber unit and a regenerator unit as well as accessory equipment. In the absorber, a down-flowing amine solution may absorb $H_2S$ and $CO_2$ from an up-flowing produced gas to produce a sweetened gas stream (i.e., an $H_2S$-free gas) as a product and an amine solution rich in the absorbed acid gases. The resultant "rich" amine may then routed into the regenerator to produce regenerated or "lean" amine may be recycled for reuse in the absorber. The stripped overhead gas from the regenerator may be concentrated $H_2S$ and $CO_2$. Such $H_2S$-rich stripped gas stream may be later converted into elemental sulfur with the $CO_2$ now available for use in the inventive technology to facilitate target pH and enhanced algal growth. As shown in FIG. 5, this isolated $CO_2$, instead of being released into the environment, may be captured in the algae biomass itself, which may in turn be disposed of effectively sequestering the $CO_2$. In another example, $CO_2$ emissions which may be stripped from, for example oil field methane in gas-cleaning facilities may provide an appropriate carbon source for the invention generally described herein. Again, such example is merely illustrative and in no way limiting on the invention which contemplates various $CO_2$ capture and isolation systems and processes.

In some embodiments, certain industrial processes may produce already isolated $CO_2$ as a byproduct. In one example, a gas cleaning plant may produce as waste stream of $CO_2$ which typically may need to be captured and sequestered. As such, in some embodiments, the current inventive technology may be situated in close proximity to such a $CO_2$ producing facility and may utilize the waste $CO_2$ as a pH adjustor as well as a carbon source for algal growth. In addition, such waste stream $CO_2$ may be transported by, for example pipelines for use in the in current invention. As noted above, such $CO_2$ may not only stimulate algal growth by acting as a carbon source and pH optimizer, but may be effectively captured in the algae biomass. This biomass may in turn be harvested and disposed of, for example through underground sequestration and the like.

Figure 6:
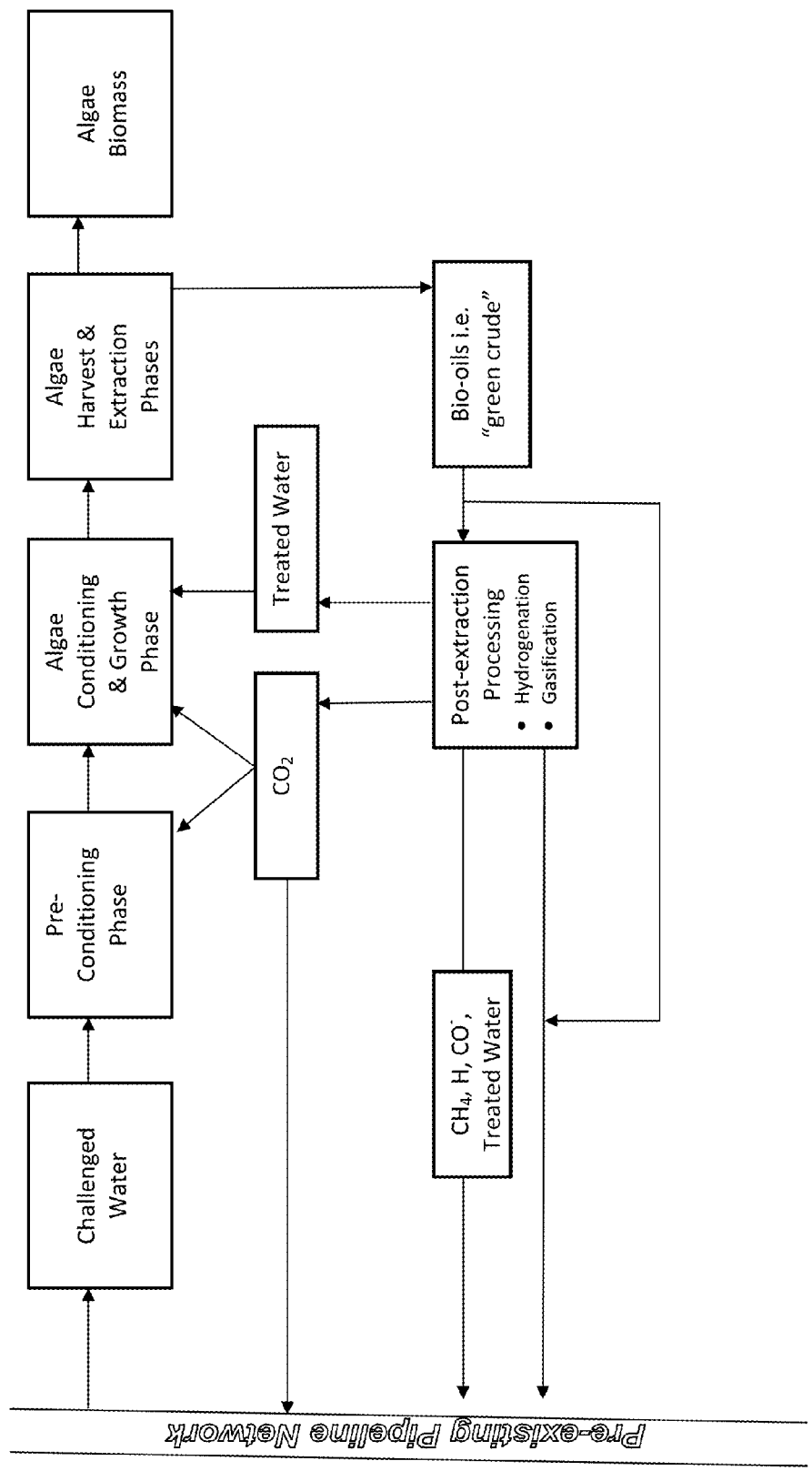
FIG. 6: is a schematic view of an algae-based capture and sequestration of carbon-dioxide as well as production of bio-fuel components utilizing produced water and pre-existing oil and gas production facilities and pipelines in one embodiment thereof.

Now generally referring to FIG. 6, certain embodiments of the inventive technology may include the production of feedstock components for various bio-fuels. Such bio-oils are sometime broadly referred to as "green crude" within the industry and can be shipped through pipelines to larger facilities for additional processing ultimately resulting in what would be termed "bio-fuels." As described above, the inventive technology may be situated next to existing oil and gas facilities and/or pipelines. In this regard, existing pipeline infrastructure may transport produced water for treatment. Such treated produced water may then be transported back through the same existing pipeline infrastructure for additional treatment prior to environmental release or for injection extraction and/or disposal. In addition, in certain embodiments, as described above, bio-oils may be extracted from the algae and transported through the same existing pipeline structures for further processing. In still further embodiments, said bio-oils may be processed post-extraction. In this step, such bio-oils may be further processed, "in situ" through known processes within the industry such as hydrogenation, or gasification i.e. converting organic or fossil based carbonaceous materials into $CO^-$, H and $CO_2$. In some embodiment, the generation of gaseous $CO_2$ may be re-routed to support target pH as well as act as a carbon supply for algal growth. The above referenced by-products may also be transported through existing infrastructure for additional processing. In additional embodiments such bio-oils may be directly transported back through existing pipeline infrastructures for additional processing. As noted above, in certain embodiments the flow of various inputs and outputs—such as produced or otherwise compromised water, bio-oils and $CO_2$ and the like—through such pre-existing pipelines and other infrastructure. As noted above, the flow of the various inputs and outputs may be automated and adaptive such that appropriate sensors apparatus and control mechanism may monitor and/or measure control said inflow and outflows. Such automated controls may be accomplished based on a pre-determined schedule or perhaps may even be adaptive based on certain thresholds perhaps based on a need or level of inflow or outflow product, and/or even production level achieved. Again, it should be noted that such processing steps are merely exemplary and in no way should be considered limiting in the current invention.

Figure 9:
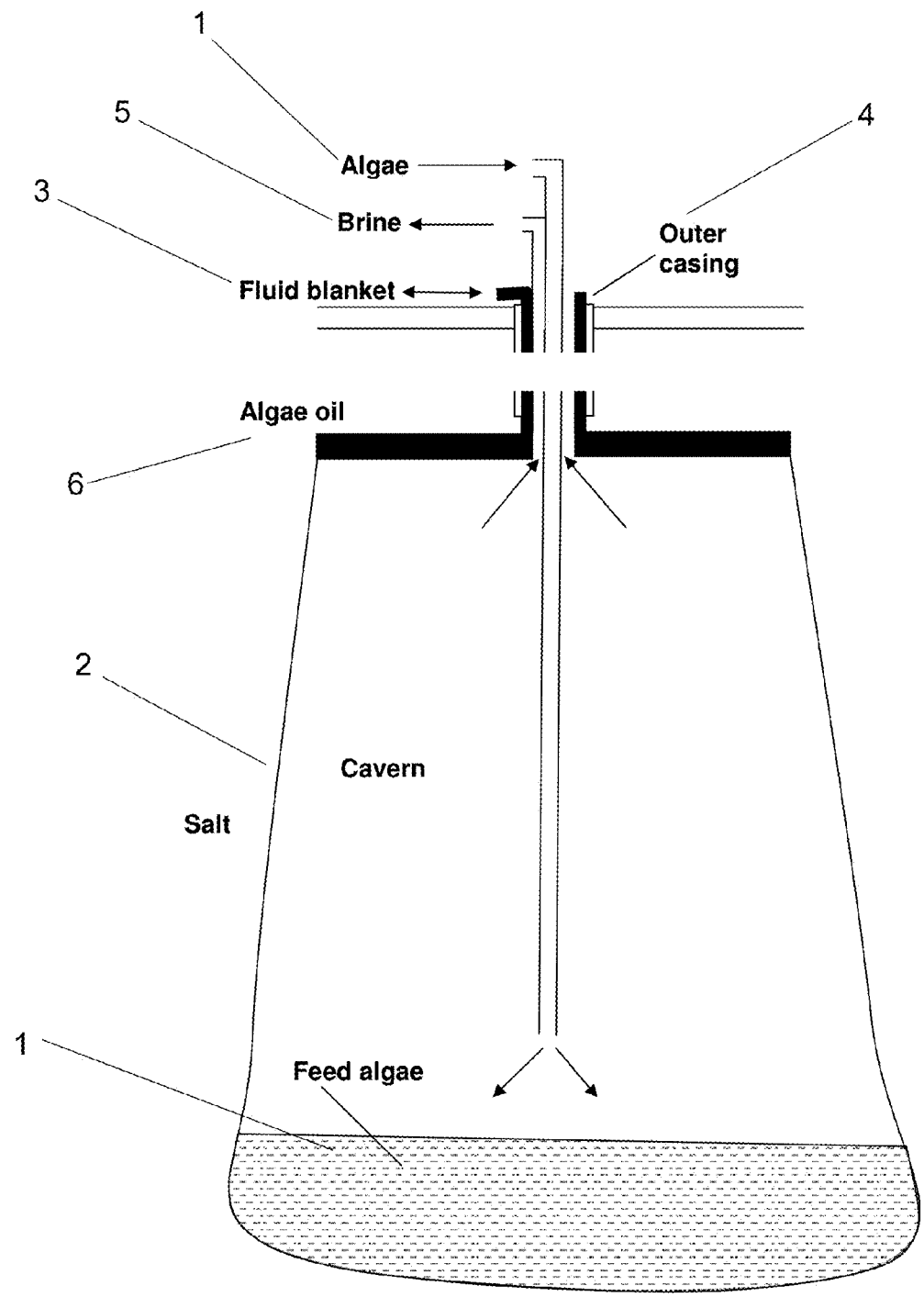
FIG. 9: is an exemplary diagram of a brine well-algae injection embodiment.

Generally referring to FIG. 9, certain embodiments of the proposed invention may allow the utilization of algae in large scale commercial farms to capture carbon from single point emissions sourced from, for example gas facilities that may vent to atmosphere hundreds of tons of $CO_2$ daily. In a preferred embodiment, the current inventive technology may provide for subterranean storage of whole algae, algae lipids and de-lipidated algae as well as the generation of extractable algae-oil. These algae (1) may then be stored underground in karsts or abandoned brine wells (2) until such time as it may be needed for conversion into biofuels. While incarcerated in these geological and man-made formations, certain technologies may be developed to more efficiently convert the biomass. In addition, in certain embodiments it may be undertaken to enhance the conversion of the algae into hydrocarbons such as the introduction of hydrogen gas, pressure, heat, and biological agents and microbes to preprocess the algae so that when it is extracted it may not require as much processing.

For example, algae may have the ability to capture $CO_2$ in the form of non-gaseous bicarbonate. The method for taking gaseous $CO_2$ from single point emission sources into bicarbonate as described herein may encompass various embodiments of the current invention. In this exemplary process, $CO_2$ is diverted from the emission point to a treatment system that may consist of a vessel wherein the $CO_2$ is showered by water, including, for example produced water, in a limestone packed tower. The limestone (calcium bicarbonate) may catalyze the reaction and fix the $CO_2$ in bicarbonate ($HCO_3$) form. In this form algae may be able to capture between 1.6 and 2 grams of $CO_2$ for every gram of algal biomass produced. For purposes of this invention it will be assumed that 1.8 tons of $CO_2$ will be captured and stored for every 1 ton of algae stored in the strategic algae reservoir (SAR).

In another embodiment of the current invention, $CO_2$ sequestered in algae may be transported to and pumped into, in this example a brine well, or other suitable subterranean cavern (2). It should be noted that any type of appropriate subterranean structure may be appropriate and within the scope of this disclosure. Such examples include, but may not be limited to a paleokarst storage reservoir, a breccia zone, or cavernous porosity, abandoned potash mine s and/or any suitable geological formation such as a cave, karst, or generally a cavern.

Such actions may be accomplished with known injection technologies within the oil and gas fields, such as pressure injection devices, a fluid blanket (3) as well as perhaps appropriate casing ELEMENTS (4). In this embodiment, as shown in FIG. 9, algae (1), having sequestered a desired amount of $CO_2$ as generally described herein, may be injected into a brine well (2) under pressure such that as the algae is injected into the bottom of well. In this embodiment brine (5) may be extracted from the top of the well structure. Such extraction may be the result of an active pump, or pressurized extraction as well as perhaps passive displacement of the brine by the injection of the algae, and/or a combination of the two.

In this embodiment, as the brine (5) is replaced with algae (1), algae oil (6) may begin to be formed within the well. This algae oil (6) may be formed by the algae and migrate or be deposited approximately near the top of a well structure. By way of illustration, in conventional brine wells diesel may be pump into the well to prevent the water from dissolving the dome of the well and causing it to cave in. As such, this produced algae oil (6) may not only provide an extractable hydrocarbon source, but may create a buffered zone within the well structure to prevent water or other types of erosion damaging the well integrity.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the statements of invention.

As can be easily understood from the foregoing, the basic concepts of the present invention may be embodied in a variety of ways. It involves both algae based water treatment techniques as well as devices to accomplish the appropriate algae based water treatment. In this application, the water treatment techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in method-oriented terminology, each element of the method implicitly may be performed by a device. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting any claims. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "filter" should be understood to encompass disclosure of the act of "filtering"—whether explicitly discussed or not—and, conversely, were there effectively disclosure of the act of "filtering", such a disclosure should be understood to encompass disclosure of a "filtration method and/or technique, and or device" and even a "means for filtering and or filtration". Such changes and alternative terms are to be understood to be explicitly included in the description.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references in any information disclosure statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of invention to at least: i) each of the algae based water treatment devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, xii) each potentially dependent claim or concept as a dependency on each and every one of the independent claims or concepts presented, and xiii) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in Hakim v. Cannon Avent Group, PLC, 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, or even claim 715 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Furthermore, it should be noted that certain embodiments of the current invention may indicate, for example a filter, or the step of filtering. It should be noted that these may indicate a direct or in some cases an indirect connection and/or bring together of disparate or non-disparate elements in a functional, non-functional or desired configuration.

In addition and as to computer aspects and each aspect amenable to software, programming or other electronic automation, the applicant(s) should be understood to have support to claim and make a statement of invention to at least: xvi) processes performed with the aid of or on a computer as described throughout the above discussion, xv) a programmable apparatus as described throughout the above discussion, xvi) a computer readable memory encoded with data to direct a computer comprising means or elements which function as described throughout the above discussion, xvii) a computer configured as herein disclosed and described, xviii) individual or combined subroutines and programs as herein disclosed and described, xix) the related methods disclosed and described, xx) similar, equivalent, and even implicit variations of each of these systems and methods, xxi) those alternative designs which accomplish each of the functions shown as are disclosed and described, xxii) those alternative designs and methods which accomplish each of the functions shown as are implicit to accomplish that which is disclosed and described, xxiii) each feature, component, and step shown as separate and independent inventions, and xxiv) the various combinations and permutations of each of the above.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. An algae-based system for treating challenged water comprising the steps of:
   transporting challenged water to a location suitable for algae-based treatment;
   pre-conditioning said challenged water further comprising the steps of:
      desalinating said challenged water;
      separating said challenged water;
      filtering said challenged water;
      adjusting the pH of said challenged water to a target level;
      flocculating said challenged water; and
      scrubbing said challenged water;
   allowing algal growth in seed water to a pre-determined threshold further comprising the steps of:
      establishing a volume of said seed water ($X_1$) in at least one algae conditioning reservoir; and
      inoculating said seed water;
   propagating conditioned algae growth in said algae conditioning reservoir further comprising the steps of:
      adding a discrete amount of said pre-conditioned challenged water ($Y_1$) to said algae conditioning reservoir generating a hybrid water mix ($Y_1,X_1$) of seed and pre-conditioned challenged water;
      agitating said hybrid water mix to promote algal growth;
      adjusting the pH of said hybrid water mix to promote algal growth;
      supplementing said hybrid water mix with nutrients to promote algal growth;
      allowing accommodated algal growth in said hybrid water mix to a pre-determined threshold;
      step-wise altering the composition of said seed water and said pre-conditioned challenged water forming a series of hybrid water mixes ($Y_x,X_x$) of seed and pre-conditioned challenged water;
      step-wise supplementing said hybrid water mix with algal growth promoting components;
      allowing accommodated algal growth after each step-wise composition and/or component change; and
      continuing step-wise composition and/or component change until a target conditioned growth profile is achieved;
   maintaining algal growth at a target conditioned growth profile to generate a target level of algal biomass;
   removing challenged water contaminate components through algal metabolization and/or sequestration;
   harvesting said algal biomass from said algae conditioning reservoir;
   removing algal treated water from said conditioning reservoir; and
   transporting said treated water for secondary disposition.

2. An algae-based system for treating challenged water as described in claim 1 wherein said challenged water is produced water.

3. An algae-based system for treating challenged water described in claim 2 wherein said challenged water is challenged water selected from the group consisting of: hydrocarbon contaminated water; diluted challenged water; seawater; saline water; brackish water; constituent water; wastewater; injection-water; industrial wastewater; well water; natural wastewater; treated water; un-treated water; water prohibitive for algal growth; municipal wastewater; agricultural wastewater; potash mining wastewater; mining waste water; hybrid mix of challenged waters; BTEX contaminated water; nitrite contaminated water; cyanide contaminated water; radioactive contaminated water; sediment contaminated water; sulfide contaminated water; hydrogen sulfide contaminated water; hydraulic fracturing waste water; oil and gas extraction water; flowback water; frac water; and hydraulic fracturing water.

4. A method of algae-based treatment of produced water comprising the steps of:
   transporting produced water to a location suitable for algae-based treatment;
   pre-conditioning said produced water;

allowing algal growth in seed water to a pre-determined threshold comprising the steps of:
    establishing a volume of said seed water ($X_1$) in at least one algae conditioning reservoir; and
    inoculating said seed water;
propagating conditioned algae growth in said algae conditioning reservoir comprising the steps of:
    adding a discrete amount of said pre-conditioned produced water ($Y_2$) to said algae conditioning reservoir generating a hybrid water mix ($Y_x, X_x$) of seed and pre-conditioned produced water;
    allowing accommodated algal growth in said hybrid water mix to a pre-determined threshold;
    step-wise altering the composition of said seed water and said pre-conditioned produced water forming a series of hybrid water mixes of seed and pre-conditioned produced water;
    step-wise supplementing said hybrid water mix with algal growth promoting components; and
    allowing accommodated algal growth after each step-wise composition change in said hybrid water mix and/or each step-wise growth promoting component change in said of hybrid water mix until a target conditioned growth profile is achieved;
removing produced water contaminate components through algal metabolization and/or sequestration;
removing algal treated water from said conditioning reservoir; and
transporting said treated water for secondary disposition.

5. A method of algae-based treatment of produced water as described in claim 4 wherein said produced water is challenged water.

6. A method of algae-based treatment of produced water as described in claim 5 wherein said challenged water is challenged water selected from the group consisting of: hydrocarbon contaminated water; diluted challenged water; seawater; saline water; brackish water; constituent water; wastewater; injection-water; industrial wastewater; well water; natural wastewater; treated water; un-treated water; water prohibitive for algal growth; municipal wastewater; agricultural wastewater; potash mining wastewater; mining waste water; hybrid mix of challenged waters; BTEX contaminated water; nitrite contaminated water; cyanide contaminated water; radioactive contaminated water; sediment contaminated water; sulfide contaminated water; hydrogen sulfide contaminated water; hydraulic fracturing waste water; oil and gas extraction water; oil and gas extraction water; flowback water; frac water; and hydraulic fracturing water.

7. A method of algae-based treatment of produced water as described in claim 4 wherein said step of step-wise supplementing said hybrid water mix with algal growth promoting components comprises the step of supplementing said hybrid water mix selected from the group consisting of: step-wise supplementing said hybrid water mix with municipal wastewater; step-wise supplementing said hybrid water mix with agricultural wastewater; and step-wise supplementing said hybrid water mix with potash mining wastewater.

8. A method of algae-based treatment of produced water as described in claim 4 and further comprising the step of supplement said seed water wherein said step is selected from the group consisting of: supplementing said seed water with potassium; supplementing said seed water with nitrogen; supplementing said seed water with phosphorus; supplementing said seed water with sodium; supplementing said seed water with magnesium; supplementing said seed water with calcium; supplementing said seed water with manganese; supplementing said seed water with silica; supplementing said seed water with bicarbonate; supplementing said seed water with sulfate; supplementing said seed water with iron; supplementing said seed water with cobalt; supplementing said seed water with copper; supplementing said seed water with selenium; supplementing said seed water with chromium; supplementing said seed water with boron; supplementing said seed water with carbon; supplementing said seed water with sunlight; supplementing said seed water with municipal wastewater; supplementing said seed water with agricultural wastewater; and supplementing said seed water with potash mining waste water.

9. A method of algae-based treatment of produced water as described in claim 4 and further comprising the step of agitating said seed and/or hybrid water.

10. A method of algae-based treatment of produced water as described in claim 4 and further comprising the step of removing a discrete amount of hybrid water coupled with the addition of an additional amount of said seed water to said algae conditioning reservoir.

11. A method of algae-based treatment of produced water as described in claim 4 and further comprising the step of removing a discrete amount of hybrid water coupled with the addition of an additional amount of said pre-conditioned produced water to said algae conditioning reservoir.

12. A method of algae-based treatment of produced water as described in claim 4 and further comprising the step of removing a discrete amount of hybrid water coupled with the addition of an amount of fresh water to said algae conditioning reservoir.

13. A method of algae-based treatment of produced water as described in claim 4 and further comprising the step of removing a discrete amount of hybrid water coupled with the addition of an amount of non-pre-conditioned produced water to said algae conditioning reservoir.

14. A method of algae-based treatment of produced water as described in claim 4 wherein said step of step-wise altering the composition of said seed water and said pre-conditioned produced water forming a series of hybrid water mixes of seed and pre-conditioned produced water comprises the step of step-wise altering the composition of said seed water and said pre-conditioned produced water such that said seed water represents approximately at least 0.1%-99.9% of said hybrid water mix and said pre-conditioned produced water represents approximately at least 0.1%-99.9% of said hybrid water mix.

15. A method of algae-based treatment of produced water as described in claim 4 and further comprising the step of adding a discrete amount of non-preconditioned produced water ($Z_1$) to said seed water and/or hybrid water mix.

16. A method of algae-based treatment of produced water as described in claim 15 wherein said step of adding a discrete amount of non-preconditioned produced water to said seed water and/or hybrid water mix comprises the step of step-wise altering the composition of said seed water, said pre-conditioned produced water and/or said non-preconditioned produced water such that said seed water represents approximately at least 0.1%-99.9% of said hybrid water mix, said pre-conditioned produced water represents approximately at least 0.1%-99.9% of said hybrid water mix, and said non-preconditioned produced water represents approximately at least 0.1%-99.9% of said hybrid water mix.

17. A method of algae-based treatment of produced water as described in claim 4 wherein said step of transporting said treated water for secondary disposition comprises the step of selected from the group consisting of: well injecting said treated water; well storing said treated water; releasing said treated water into the environment; and treating said treated water to secondary water treatment(s).

18. A method of algae-based treatment of produced water as described in claim 4 wherein said step of propagating conditioned algae growth comprises the step of generating genetically adaptive variant algal strains.

19. A method of algae-based treatment of produced water as described in claim 4 wherein said step of removing produced water contaminate components through algal metabolization and/or sequestration comprises the step of removing produced water contaminate components selected from the group consisting of: removing produced water salt components; removing produced water metal components; removing produced water trace element components; and removing produced water $CO_2$ components; removing produced water inorganic compound components; removing produced water organic compound components; removing produced water inorganic salt compound components; removing produced water brine salt components; removing produced water iron components, removing produced water nickel components, removing produced water chromium components, removing produced water arsenic components, removing produced water methane components and removing produced water ammonia components.

20. A method of algae-based treatment of produced water as described in claim 4 and further comprising the step of harvesting said algal biomass from said algae conditioning reservoir.

21. A method of algae-based treatment of produced water as described in claim 20 wherein said step of harvesting said algal biomass from said algae conditioning reservoir comprises the step of harvesting said algal biomass selected from the group consisting of: extracting livestock feed; extracting industrial feedstock; extracting feedstock bio-oils from said algal biomass; extracting bio-oils from said algal biomass; extracting lipid-extracted algae from said algal biomass; extracting inorganic salt compounds from said algal biomass; and extracting brine salts from said algal biomass.

22. A method of algae-based treatment of produced water as described in claim 20 wherein said step of harvesting said algal biomass from said algae conditioning reservoir comprises the step of selected from the group consisting of: extracting livestock feed; extracting industrial feedstock; extracting feedstock bio-oils from said algal biomass; extracting bio-oils from said algal biomass; extracting lipid-extracted algae from said algal biomass; extracting inorganic salt compounds from said algal biomass; and extracting brine salts from said algal biomass.

23. A method of algae-based treatment of produced water as described in claim 20 wherein said step of harvesting said algal biomass from said algae conditioning reservoir comprises the step of well injecting said biomass.

24. A method of growing algae in challenged water comprising the steps of:
   establishing a volume of seed water $(X_1)$ in at least one algae conditioning reservoir;
   inoculating said seed water;
   adding a discrete amount of challenged water $(Y_1)$ to said algae conditioning reservoir generating a hybrid water mix $(Y_1, X_1)$ of seed and challenged water;
   establishing a target conditioned growth profile;
   allowing accommodated algal growth in said hybrid water mix to a pre-determined threshold;
   step-wise altering the composition of said seed water and said challenged water forming a series of hybrid water mixes $(Y_X, X_X)$ of seed and challenged water;
   step-wise supplementing said hybrid water mix with algal growth promoting components; and
   allowing accommodated algal growth after each step-wise percent composition change in said of hybrid water mix and/or each step-wise growth promoting component change of said seed and said challenged water until said algae conditioning reservoir contains a target percentage of seed and challenged water and a population of genetically adaptive variant algal strains.

\* \* \* \* \*